(12) United States Patent
Prud'Hommeaux et al.

(10) Patent No.: US 9,035,887 B1
(45) Date of Patent: May 19, 2015

(54) INTERACTIVE USER INTERFACE

(75) Inventors: Marc Prud'Hommeaux, Portland, OR (US); Augustus A. White, Houston, TX (US)

(73) Assignee: Lexcycle, Inc, Portland, OR (US)

( * ) Notice: Subject to any disclaimer, the term of this patent is extended or adjusted under 35 U.S.C. 154(b) by 1059 days.

(21) Appl. No.: 12/500,827

(22) Filed: Jul. 10, 2009

(51) Int. Cl.
G06F 3/033 (2013.01)
A63B 21/00 (2006.01)

(52) U.S. Cl.
CPC ..................... A63B 21/00 (2013.01)

(58) Field of Classification Search
CPC ..... G06F 3/017; G06F 3/044; G06F 3/04812; G06F 3/0482; G06F 3/04847; G06F 3/0485; G06F 3/0486; G06F 3/0488; G06F 3/04883; G06F 2203/04806; G06F 2203/04808; H04N 21/4221; H04N 21/42222; H04N 21/4312; H04N 21/43615; H04N 21/4438; H04N 21/482; H04N 21/4131; H04N 5/44543; G11B 19/025; G11B 27/002; G11B 27/034; G11B 27/105; G11B 33/10
USPC .................. 345/173; 715/785, 831
See application file for complete search history.

(56) References Cited

U.S. PATENT DOCUMENTS

| | | | |
|---|---|---|---|
| 3,618,032 A | 11/1971 | Goldsberry et al. | |
| 4,574,363 A | 3/1986 | Carlgren et al. | |
| 5,295,069 A | 3/1994 | Hersey et al. | |
| 6,157,381 A | 12/2000 | Bates et al. | |
| 6,243,071 B1 | 6/2001 | Shwarts et al. | |
| 6,747,680 B1 | 6/2004 | Igarashi et al. | |
| 6,992,687 B1 | 1/2006 | Baird et al. | |
| 7,437,683 B1 | 10/2008 | Beezer et al. | |
| 7,516,402 B2 | 4/2009 | Koivisto et al. | |
| 2002/0011990 A1 | 1/2002 | Anwar | |
| 2002/0023270 A1 | 2/2002 | Thomas et al. | |
| 2002/0109728 A1 | 8/2002 | Tiongson et al. | |
| 2002/0126154 A1 | 9/2002 | Watson | |
| 2004/0059645 A1 | 3/2004 | Wirth, Jr. | |
| 2004/0085364 A1 | 5/2004 | Keely et al. | |

(Continued)

OTHER PUBLICATIONS

Non-Final Office Action for U.S. Appl. No. 12/500,871, mailed on May 10, 2012, Prud'Hommeaux et al., "Dynamically Hyphenating Text", 14 pages.

(Continued)

*Primary Examiner* — Amare Mengistu
*Assistant Examiner* — Jennifer Zubajlo
(74) *Attorney, Agent, or Firm* — Lee & Hayes, PLLC

(57) ABSTRACT

Methods and apparatuses are provided for navigating an electronic document. In one implementation, a method includes executing a command associated with a region selected by a tap gesture. In another implementation, a method includes displaying a slider on a slide bar including an expanded part corresponding to a section of the electronic document. The expanded part is disproportionately larger than other parts of the slide bar corresponding to other sections of the electronic document. Methods and apparatuses are provided for activating an element of an electronic document. In one implementation, a method includes activating the element selected by a touch gesture. Methods and apparatuses are provided for controlling a perceived brightness of an electronic document. In one implementation, a method includes displaying a partially opaque graphical object in front of the electronic document. The perceived brightness of the electronic document being based on an opacity of the graphical object.

26 Claims, 20 Drawing Sheets

810 of the river. But the Martian machine took no more notice for the moment of the people running this way and that than a man would of the confusion of ants in a nest against which his foot has kicked. When, half suffocated, I raised my head above water, the Martian's hood pointed at the batteries that were still firing across the river, and as it advanced it swung loose what must have been the generator of

(56) References Cited

U.S. PATENT DOCUMENTS

| | | |
|---|---|---|
| 2004/0095394 A1 | 5/2004 | Fox et al. |
| 2004/0122731 A1 | 6/2004 | Mannik et al. |
| 2004/0205568 A1 | 10/2004 | Breuel et al. |
| 2005/0005246 A1 | 1/2005 | Card et al. |
| 2005/0097007 A1 | 5/2005 | Alger et al. |
| 2005/0261987 A1 | 11/2005 | Bezos et al. |
| 2006/0173751 A1 | 8/2006 | Schwarze et al. |
| 2006/0173754 A1 | 8/2006 | Burton et al. |
| 2006/0227153 A1 | 10/2006 | Anwar et al. |
| 2007/0238077 A1 | 10/2007 | Strachar |
| 2008/0122794 A1* | 5/2008 | Koiso .................. 345/173 |
| 2008/0165141 A1* | 7/2008 | Christie ............... 345/173 |
| 2008/0208715 A1 | 8/2008 | Hod et al. |
| 2008/0231610 A1* | 9/2008 | Hotelling et al. ...... 345/173 |
| 2009/0002335 A1 | 1/2009 | Chaudhri |
| 2009/0015568 A1 | 1/2009 | Koski |
| 2009/0132234 A1* | 5/2009 | Weikel ................ 704/3 |
| 2009/0235201 A1* | 9/2009 | Baalbergen et al. ..... 715/785 |
| 2010/0088632 A1 | 4/2010 | Knowles et al. |
| 2010/0146435 A1 | 6/2010 | Cros |
| 2010/0231535 A1 | 9/2010 | Chaudhri et al. |

OTHER PUBLICATIONS

Non-Final Office Action for U.S. Appl. No. 12/500,792, mailed on May 15, 2012, Marc Prud'Hommeaux et al., "Interactive User Interface", 8 pages.

Office action for U.S. Appl. No. 12/500,871, mailed on Nov. 28, 2011, Prud'Hommeaux et al., "Dynamically Hyphenating Text", 14 pages.

Final Office Action for U.S. Appl. No. 12/500,898, mailed on Jun. 13, 2011, Marc Prud'Hommeaux, "Online Catalog".

Whatis.com, "Atom (XML)", updated Jun. 14, 2006, retrived at <<http://whatis.techtargert.com/definition/0,,sid9_gci1191741,00.html>>, on Dec. 22, 2011, pp. 1-pp. 2.

Office action for U.S. Appl. No. 12/500,871, mailed on Nov. 21, 2012, Prud'Hommeaux et al., "Dynamically Hyphenating Text", 18 pages.

Office Action for U.S. Appl. No. 12/500,898, mailed on Nov. 6, 2013, Marc Prud'Hommeaux, "Online Catalog", 19 pages.

Final Office Action for U.S. Appl. No. 12/500,898, mailed on Apr. 11, 2014, Marc Prud'Hommeaux, "Online Catalog", 24 pages.

Office action for U.S. Appl. No. 12/500,898, mailed on Sep. 10, 2014, Prud'Hommeaux et al., "Online Catalog", 26 pages.

* cited by examiner of the river. But the Martian machine took no more notice for the moment of the people running this way and that than a man would of the confusion of ants in a nest against which his foot has kicked. When, half suffocated, I raised my head above water, the Mar-tian's hood pointed at the batteries that were still firing across the river, and as it advanced it swung loose

Tap Left:
Previous Page

Tap Center:
Show/Hide Controls

Tap Right:
Next Page

Fig. 7 of the river. But the Martian machine took no more notice for the moment of the people running this way and that than a man would of the confusion of ants in a nest against which his foot has kicked. When, half suffocated, I raised my head above water, the Martian's hood pointed at the batteries that were still firing across the river, and as it advanced it swung loose what must have been the generator of

Fig. 8A of the river. But the Martian machine took no more notice for the moment of the people running this way and that than a man would of the confusion of ants in a nest against which his foot has kicked. When, half suffocated, I raised my head above water, the Martian's hood pointed at the batteries that were still firing across the river, and as it advanced it swung loose what must have been the generator of Chapter 5
Page 41/98

Fig. 8B

1010 fumbling at the latch! It had found the door! The Martians understood doors!

It worried at the catch for a minute, perhaps, and then the door opened.

In the darkness I could just see the thing—like an elephant's trunk more than anything else—waving towards me and touching and examining the wall, coals, wood and ceiling. It was like a black worm swaying its blind head to and fro.

Once, even, it touched the heel of my boot. I was on the verge of screaming; I bit my hand. For a time the tentacle was silent. I could have fancied it had been withdrawn. Presently, with an abrupt click, it gripped something—I thought it had me!—and seemed to go out of the cellar again. For a minute I was not sure. Apparently it had taken a lump of coal to examine.

I seized the opportunity of slightly shifting

Fig. 10A

1020 fumbling at the latch! It had found the door! The Martians understood doors!

It worried at the catch for a minute, perhaps, and then the door opened.

1022

In the darkness I could just see the thing—like an elephant's trunk more than anything else—waving towards me and touching and examining the wall, coals, wood and ceiling. It was like a black worm swaying its blind head to and fro.

Once, even, it touched the heel of my boot. I was on the verge of screaming; I bit my hand. For a time the tentacle was silent. I could have fancied it had been withdrawn. Presently, with an abrupt click, it gripped something—I thought it had me!—and seemed to go out of the cellar again. For a minute I was not sure. Apparently it had taken a lump of coal to examine.

I seized the opportunity of slightly shifting

Fig. 10B

Text Detail

Tap to Select, Pinch & Spread to Zoom

✕

In the darkness I could just see the thing—like an elephant's trunk more than anything else—waving towards me and touching and examining the wall, coals, wood and ceiling. It was like a black worm swaying its blind head to and fro.

[Definition]

Fig. 12A

Text Detail

Tap to Select, Pinch & Spread to Zoom

✕ s I could just see ephant's trunk more waving towards me amining the wall, c . It was like a black w head to and fro.

[Definition]

Fig. 12B fumbling at the latch! It had found the door! The Martians understood doors!

It worried at the catch for a minute, perhaps, and then the door opened.

In the darkness I could just see the thing—like an elephant's trunk more than anything else—waving towards me and touching and examining the wall, coals, wood and ceiling. It was like a black worm swaying its blind head to and fro.

Chapter 7
Page 5/13

Once, even, it touched the heel of my boot. I was on the verge of screaming; I bit my hand. For a time the tentacle was silent. I could have fancied it had been withdrawn. Presently, with an abrupt click, it gripped something—I thought it had me!—and seemed to go out of the cellar again. For a minute I was not sure. Apparently it had taken a lump of coal to examine.

I seized the opportunity of slightly shifting

Fig. 15

For a moment perhaps I stood there, breast-high in the almost boiling water, dumbfounded at my position, hopeless of escape. Through the reek I could see the people who had been with me in the river scrambling out of the water through the reeds, like little frogs hurrying through grass from the advance of a man, or running to and fro in utter dismay on the towing path.

Then suddenly the white flashes of the Heat-Ray came leaping towards me. The houses caved in as they dissolved at its touch, and darted out flames; the trees changed to fire with a roar. The Ray flickered up and down the towing path, licking off the people who ran this way and that, and came down to the water's edge not fifty yards from where I stood. It swept across the river to Shepperton, and the water in its track rose in a boiling weal crested with steam. I turned shoreward. In another moment the huge wave, well-high

Chapter 7
Page 11/13

Fig. 16

Chapter 9

For a time I believed that mankind had been swept out of existence, and that I stood there alone, the last man left alive. Hard by the top of Putney Hill I came upon another skeleton, with the arms dislocated and removed several yards from the rest of the body. As I proceeded I became more and more convinced that the extermination of mankind was, save for such stragglers as myself, already accomplished in this part of the world. The Martians, I thought, had gone on and left the country desolated, seeking food elsewhere. Perhaps even now they were destroying Berlin or Paris, or it might be they had gone northward.

Chapter 9

 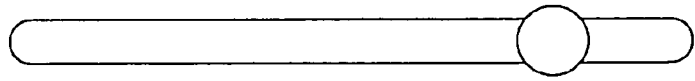 

Fig. 17 over all—silence. It filled me with indescribable terror to think how swiftly that desolating change had come.

For a time I believed that mankind had been swept out of existence, and that I stood there alone, the last man left alive. Hard by the top of Putney Hill I came upon

Fig. 19A over all—silence. It filled me with indescribable terror to think how swiftly that desolating change had come.

For a time I believed that mankind had been swept out of existence, and that I stood there alone, the last man left alive. Hard by the top of Putney Hill I came upon

Fig. 19B

INTERACTIVE USER INTERFACE

BACKGROUND

In today's information-centric world, handheld devices, such as cellular phones, smart phones, personal digital assistants (PDAs), and portable media players, among others, have proliferated rapidly throughout the general public and the business community. The computing power of these devices has increased and the networks on which handheld devices operate have seen dramatic growth. As a result of these advancements, these devices now provide access to a wide range of applications that were traditionally available via desktop computers and laptop computers. For example, wireless networks now provide handheld device users with access to email, media, and documents, such as web pages, articles, blogs, and electronic books.

Selecting icons or entering text, while relatively easy to accomplish through a traditional input device (e.g., a keyboard or mouse), presents unique challenges for handheld device users. For example, handheld devices with touch screens typically require users to touch or tap an icon or graphical button to select a command or enter text. Users often need to tap these small icons or graphical buttons in a correct sequence to perform a command. The more taps that the user must undertake, the more likely an error will occur, often to the frustration of the user.

Gestures often substitute for hardware controls for handheld devices having touch screens. The gestures should seem natural so they are easy to remember without physical labels to remind users of what to do. The gestures must also not require too much dexterity, as fingertips are very large and imprecise compared to a traditional mouse pointer. Furthermore, due to its limited screen size, any graphic controls that are visible on a touch screen, particularly when reading a document, unnecessarily consume screen real estate. The small screen also constrains the size of images and formatted text that cannot be reflowed to fit the screen.

In addition, when a user wishes to navigate within a document, such as an electronic book, the user may wish to jump to an arbitrary page or the beginning of a chapter. Both navigational methods suffer when confined to traditional controls on a small screen. For example, manually entering a page number to jump to is cumbersome and a continuous control, such as a slider, must be divided into many increments. Hitting a precise page of a large book comprising many pages is virtually impossible when operating a slider control on a small screen. Still further, backlighting can appear glaring in the dark, ruin night vision, and cause eye strain. Handheld devices typically allow a user to control the brightness of a backlight, but only through device settings. To access these device settings, users must exit applications, which is inconvenient. Therefore, there is a need for improved systems and methods that overcome the above problems.

BRIEF DESCRIPTION OF THE DRAWINGS

The accompanying drawings, which are incorporated in and constitute a part of this disclosure, illustrate various disclosed embodiments. In the drawings:

FIG. 7 is an example of a screen in a landscape orientation including regions;

FIG. 8A is an example of a screen displaying an electronic document;

FIG. 8B is an example of a screen displaying an electronic document and control objects;

FIG. 10A is an example of a screen displaying an electronic document;

FIG. 10B is an example of a screen displaying an electronic document and a highlighted element;

FIG. 12A is an example of a screen including a simple view of an element displayed in a small size;

FIG. 12B is an example of a screen including a simple view of an element displayed in a large size;

FIG. 15 is an example of a screen including a slide bar and a slider;

FIG. 16 is an example of a screen including a slide bar and a slider;

FIG. 17 is an example of a screen including a slide bar and a slider;

FIG. 19A is an example of a screen including an electronic document;

FIG. 19B is an example of a screen including an electronic document and a graphical object in front of the electronic document.

DETAILED DESCRIPTION

Figure 1:
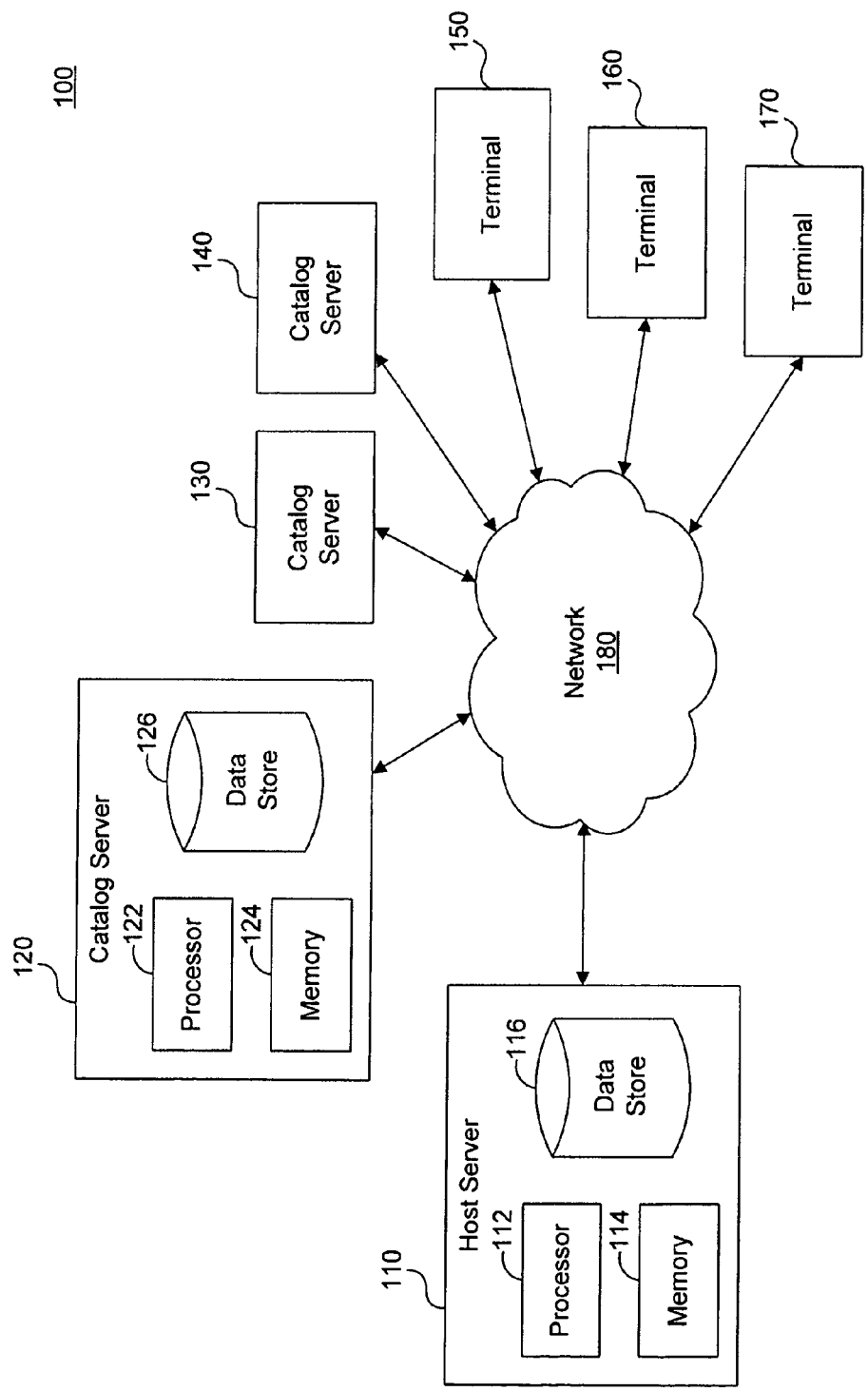
FIG. 1 is a diagram of an example of a system for providing content.

The following detailed description refers to the accompanying drawings. Wherever possible, the same reference numbers are used in the drawings and the following description to refer to the same or similar parts. While several exemplary embodiments are described herein, modifications, adaptations and other implementations are possible. For example, substitutions, additions or modifications may be made to the components illustrated in the drawings, and the exemplary methods described herein may be modified by substituting, reordering, removing, or adding steps to the disclosed methods. Accordingly, the following detailed description is not limiting of the disclosed embodiments. Instead, the proper scope is defined by the appended claims.

Disclosed embodiments provide apparatuses and computer-implemented methods for providing interactive user interfaces. The apparatuses and methods may provide a touch screen capable of detecting touch gestures executed by a user while viewing an electronic document.

Consistent with a disclosed embodiment, a computer-implemented method is provided for navigating an electronic document on a portable device. The method may include displaying the electronic document on a touch screen of the portable device. The method may further include defining a plurality of regions on the touch screen. The method may further include detecting a tap gesture on the touch screen. The method may further include determining a selection of one of the regions based on a location of the tap gesture on the touch screen. The method may further include executing, by a processor of the portable device, a command associated with the selected region.

Consistent with another disclosed embodiment, a computer implemented method is provided for navigating an electronic document on a terminal. The method may include defining a plurality of regions on a touch screen of the terminal. The method may further include detecting a tap gesture on the touch screen. The method may further include executing, by a processor of the terminal, in response to the detected tap gesture, a command associated with the selected region.

Consistent with yet another disclosed embodiment, a computer-implemented method is provided for navigating an electronic document on a terminal. The method may include defining a plurality of regions of a touch screen of the terminal. At least one of the regions may be associated with a command that displays another page of the electronic document on the touch screen. The method may further include detecting, by a processor of the terminal, a touch selection of the at least one of the regions. The method may further include executing, in response to the touch selection, the command associated with the selected at least one of the regions.

Consistent with yet another disclosed embodiment, an apparatus is provided for navigating an electronic document. The apparatus may include a touch screen including a plurality of regions. The apparatus may further include a storage comprising a detection module for detecting a tap gesture on the touch screen and for determining a selection of one of the regions based on a location of the tap gesture on the touch screen. The apparatus may further include a processor for executing, in response to the detected tap gesture, a command associated with the selected one of the regions.

Consistent with yet another disclosed embodiment, a computer-implemented method is provided for activating an element of an electronic document. The method may include displaying the electronic document on a touch screen of a terminal. The electronic document may include the element. The method may further include detecting a touch-and-hold gesture on a location of the touch screen. The method may further include highlighting the element on the touch screen. The element may be displayed at the location of the detected touch-and-hold gesture. The method may further include detecting, subsequent to the highlighting, a release of the touch-and-hold gesture from the element. The method may further include activating, by a processor of the terminal, the element based on the release of the touch-and-hold gesture.

Consistent with yet another disclosed embodiment, an apparatus is provided for activating an element. The apparatus may include a touch screen for displaying an electronic document including the element. The apparatus may further include a storage. The storage may comprise a detection module for detecting a touch-and-hold gesture on a location of the touch screen. The element may be displayed at the location of the detected touch-and-hold gesture. The detection module may be for detecting a release of the touch-and-hold gesture from the element. The storage may further comprise a highlighting module for highlighting the element on the touch screen based on the detected tough-and-hold gesture. The apparatus may further include a processor for activating, based on the release of the touch-and-hold gesture, the element.

Consistent with yet another disclosed embodiment, a computer-implemented method is provided for navigating an electronic document on a terminal. The method may include displaying, by a processor of the terminal, a page of a section of the electronic document on a touch screen of the terminal. The electronic document may include one or more sections. Each section may include one or more pages. The method may further include displaying a slider on a slide bar on the touch screen. The slide bar may include an expanded part corresponding to the displayed section of the electronic document. The expanded part may be disproportionately larger than other parts of the slide bar corresponding to other sections of the electronic document. The method may further include detecting a drag gesture on the touch screen. The drag gesture may include a movement of the slider on the slide bar. The method may further include detecting a release gesture of the slider on the touch screen. The method may further include displaying, on the touch screen, a target page of the electronic document based on the release gesture.

Consistent with yet another disclosed embodiment, a computer-implemented method is provided for navigating an electronic document on a terminal. The method may include displaying a page of a section of the electronic document on a touch screen of the terminal. The method may further include displaying a slider on a slide bar on the touch screen. The slide bar may include an expanded part corresponding to the displayed section of the electronic document. The expanded part may be disproportionately larger than other parts of the slide bar corresponding to other sections of the electronic document. The method may further include detecting a drag gesture to move the slider on the slide bar. The method may further include displaying, by a processor of the terminal, another page of the electronic document on the touch screen based on the drag gesture.

Consistent with yet another disclosed embodiment, an apparatus is provided for navigating an electronic document. The apparatus may include a touch screen for displaying a page of a section of the electronic document on a touch screen of the terminal and for displaying a slider on a slide bar on the touch screen. The slide bar may include an expanded part corresponding to the displayed section of the electronic document. The expanded part may be disproportionately larger than other parts of the slide bar corresponding to other sections of the electronic document. The apparatus may further include a storage comprising a detection module for detecting a drag gesture to move the slider on the slide bar. The apparatus may further include a processor for displaying another page of the electronic document on the touch screen based on the drag gesture.

Consistent with yet another disclosed embodiment, a computer-implemented method is provided for controlling a perceived brightness of an electronic document. The method may include displaying the electronic document on a touch screen of a terminal. The method may further include displaying a partially opaque graphical object in front of the electronic document. The perceived brightness of the electronic document through the partially opaque graphical object may be based on an opacity of the partially opaque graphical object. The opacity of the partially opaque graphical object may be adjustable from completely transparent to completely opaque. The method may further include detecting a swipe gesture on the touch screen. The method may further include controlling, by a processor of the terminal, the perceived brightness of the electronic document by adjusting the opacity of the partially opaque graphical object based on the swipe gesture.

Consistent with yet another disclosed embodiment, a computer-implemented method is provided for controlling a perceived brightness of an electronic document. The method may include displaying the electronic document on a touch screen of a terminal. The method may further include displaying a graphical object in front of the electronic document. The method may further include detecting a gesture on the touch screen. The method may further include controlling, by a processor of the terminal, the perceived brightness of the electronic document by adjusting an opacity of the graphical object based on the gesture.

Consistent with yet another disclosed embodiment, an apparatus is provided for controlling a perceived brightness of an electronic document. The apparatus may include a touch screen for displaying the electronic document and for displaying a graphical object in front of the electronic document. The apparatus may further include a storage comprising a detection module for detecting a gesture on the touch screen. The apparatus may further include a processor for controlling the perceived brightness of the electronic document by adjusting an opacity of the graphical object based on the gesture.

Consistent with other disclosed embodiments, computer-readable media are provided that store program instructions executable by a processor for performing any of the above-described methods.

Consistent with yet another disclosed embodiment, a computer-implemented method is provided for controlling a brightness of an electronic document. The method may include displaying the electronic document on a touch screen of a terminal. The method may further include detecting a vertical swipe gesture on the touch screen. The method may further include controlling, by a processor of the terminal, the brightness of the electronic document based on the vertical swipe gesture.

FIG. 1 is a diagram of an example of a system 100 for providing content, consistent with a disclosed embodiment. System 100 may provide functionality for providing an online catalog. The online catalog may provide access to catalogs that include electronic documents. As shown in system 100, a host server 110, catalog servers 120-140, and terminals 150-170 are connected to a network 180. One of ordinary skill in the art will appreciate that although one host server, three catalog servers, three terminals, and one network are depicted in FIG. 1, any number of these components may be provided. Furthermore, one of ordinary skill in the art will recognize that one or more components of system 100 may be combined and/or divided into subcomponents. For example, functionality provided by host server 110 and catalog server 120 may be combined or functionality provided by host server 110 may be subdivided across multiple components.

Network 180 may enable communications between the various components in system 100, such as host server 110, catalog servers 120-140, and terminals 150-170. In addition, terminals 150-170 may access legacy systems (not shown) via network 180, or may directly access legacy systems, data stores, or other network applications. Network 180 may include a shared, public, or private network; may encompass a wide area network or a local area network; and may be implemented through any suitable combination of wired and wireless networks. Network 180 may further comprise an intranet or the Internet. For example, catalog server 120 may transmit catalogs and catalog information to host server 110 via network 180. Host server 110 may transmit catalog information to one or more of terminals 150-170 via network 180. Furthermore, catalog server 120 may transmit electronic catalogs and electronic documents to one or more of terminals 150-170 via network 180.

In one embodiment, host server 110 may comprise a general purpose computer (e.g., a personal computer, network computer, server, or mainframe computer) having one or more processors that may be selectively activated or reconfigured by a computer program. Host server 110 may also be implemented in a distributed network. For example, host server 110 may communicate via network 180 with one or more additional host servers (not shown), which may enable host server 110 to distribute processes for parallel execution by a plurality of host servers. Alternatively, host server 110 may be specially constructed for carrying-out methods consistent with disclosed embodiments.

In one embodiment, host server 110 may constitute, for example, a web server accessible via the Internet. In another embodiment, host server 110 may include a wireless application protocol (WAP) server accessible by wireless terminals. For example, host server 110 may provide access to a web site and provide access to content.

Host server 110 may include a processor 112, such as a central processing unit (CPU). Host server 110 may include a memory 114. Memory 114 may be, for example, a random access memory (RAM). Processor 112 may load active data and program modules into memory 114 for performing one or more processes for providing content.

Host server 110 may include a data store 116. Data store 116 may be a persistent storage including, for example, hard drives, flash drives, etc. Data store 116 may include one or more databases. In one embodiment, data store 116 may constitute an online catalog data store and may store, for example, data regarding electronic catalogs and data regarding catalog servers 120-140, which may host the electronic catalogs. Data store 116 may store unique identifiers (IDs) associated with the electronic catalogs. For example, data store 116 may store catalog IDs associated with catalogs and catalog server IDs associated with catalog servers 120-140.

Data store 116 may continually receive and store new data regarding additional catalogs such that data store 116 is continually expanding and/or shrinking in scope and breadth. For example, host server 110 may receive new catalog information from one or more of catalog servers 120-140 or from other catalog servers (not shown) over network 180. Likewise, information may be removed from data store 116, such as when a catalog is no longer available or when one or more of catalog servers 120-140 become unavailable.

In one embodiment, catalog servers 120-140 may be any type of a general purpose computer (e.g., a personal computer, network computer, server, or mainframe computer) having one or more processors that may be selectively activated or reconfigured by a computer program. Catalog servers 120-140 may also be implemented in a distributed network. For example, catalog server 120 may communicate via network 180 with catalog servers 130-140, which may enable catalog server 120 to distribute processes for parallel execution by a plurality of catalog servers 130-140. Alternatively, catalog server 120 may be specially constructed for carrying-out methods consistent with disclosed embodiments.

The following discussion with respect to catalog server 120 may apply to catalog servers 130-140. In one embodiment, catalog server 120 may constitute, for example, a web server accessible via the Internet. In another embodiment, catalog server 120 may include a wireless application protocol (WAP) server accessible by wireless terminals. For example, catalog server 120 may provide access to a web site and provide access to content.

Catalog server 120 may include a processor 122, such as a central processing unit (CPU). Catalog server 120 may include a memory 124. Memory 124 may be, for example, a random access memory (RAM). Processor 122 may load active data and program modules into memory 124 for performing one or more processes for providing content.

Catalog server 120 may include a data store 126. Data store 126 may be a persistent storage including, for example, hard drives, flash drives, etc. Data store 126 may include one or more databases. In one embodiment, data store 126 may constitute a catalog data store and may store an electronic catalog and various electronic media available through the electronic catalog. For example, the electronic media may include electronic documents, such as books for sale, rent, download, or viewing from an Internet site provided by catalog server 120. For example, data store 126 may store titles, authors, images of covers, images of the pages of the books, descriptions, prices, and genres, among others, associated with the electronic books. The electronic media may further include music and videos.

Electronic documents stored in data store 126 may be associated, for example, with unique identifiers (IDs), such as a product ID or ISBN (International Standard Book Number), or any other identifier. Additionally, data store 126 may store metadata in association with product IDs. For example, the metadata may provide information describing and/or classifying an electronic document (e.g., classifying a novel by genre by associating metadata of "horror" with a product ID for a horror novel).

Consistent with other embodiments, catalog server 120 may include a web server for providing access to data store 126. For example, in one embodiment, catalog server 120 may provide access to content (e.g., articles, media, etc.) stored in data store 126 that are accessible for free or that is accessible to subscribers or other authorized users.

Data store 126 may continually expand and/or shrink in scope and breadth. For example, information regarding a new electronic document (e.g., a book that was recently published and became available) may be added to data store 126. Likewise, information regarding an existing electronic document may be removed from data store 126, for example, if the electronic document is no longer available. In addition, the electronic catalog may be updated to reflect newly available electronic documents as well as unavailable electronic documents.

Terminals 150-170 may be any type of device for communicating with host server 110 and catalog servers 120-140 over network 180. For example, terminals 150-170 may comprise a server, a personal computer, a laptop, a notebook, a portable device (e.g., a handheld device, a personal digital assistant, a phone, an electronic book reader, etc.), a set top box, or any other appropriate device capable of exchanging data with network 180.

Figure 2:
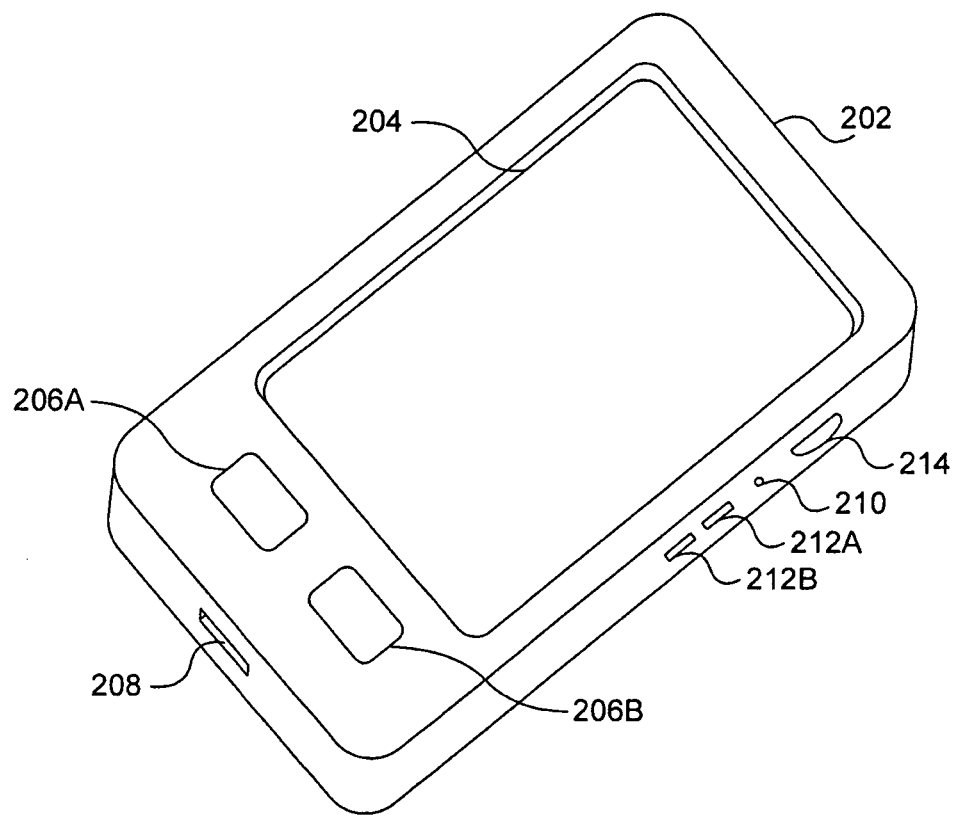
FIG. 2 is a view of an example of a terminal.

FIG. 2 is a view of an example of terminal 150. The following description of terminal 150 may apply to terminals 160-170. As mentioned above, although terminal 150 is depicted as a small and portable device, terminal 150 may be a computer including, for example, a server, a desktop, a laptop, a notebook, an electronic book reader, a phone, etc. Terminal 150 may comprise a body 202 and a display screen 204. Display screen 204 may be any screen for displaying text and/or graphics including, for example, a liquid crystal display (LCD). Display screen 204 may include a touch screen such that terminal 150 is able to detect touches on the touch screen as user inputs. Terminal 150 may comprise one or more buttons 206A and 206B. Buttons 206A and 206B may have fixed commands. Alternatively, the commands associated with buttons 206A and 206B may be dynamically changed by terminal 150. Furthermore, buttons 206A and 206B may be configurable by a user to perform specific functions.

Terminal 150 may further comprise a port 208 for receiving electrical power including, for example, an alternating current (AC) port, a direct current (DC) port, and a universal serial bus (USB) port. Alternatively, port 208 may enable data communication. For example, port 208 may constitute a USB port, IEEE 1394 port, etc. Port 208 may serve a dual purpose and be an electrical power port and a data communication port. Terminal 150 may comprise an audio port 210 for connecting, for example, a headphone and/or a microphone. Terminal 150 may comprise volume control buttons 212A and 212B. Terminal 150 may comprise a scroll button 214 for providing user input. Terminal 150 may further comprises a battery (not shown), a transmitter (not shown) and a receiver (not shown), such as an antenna, a speaker (not shown), and a removal storage slot (not shown).

Figure 3:
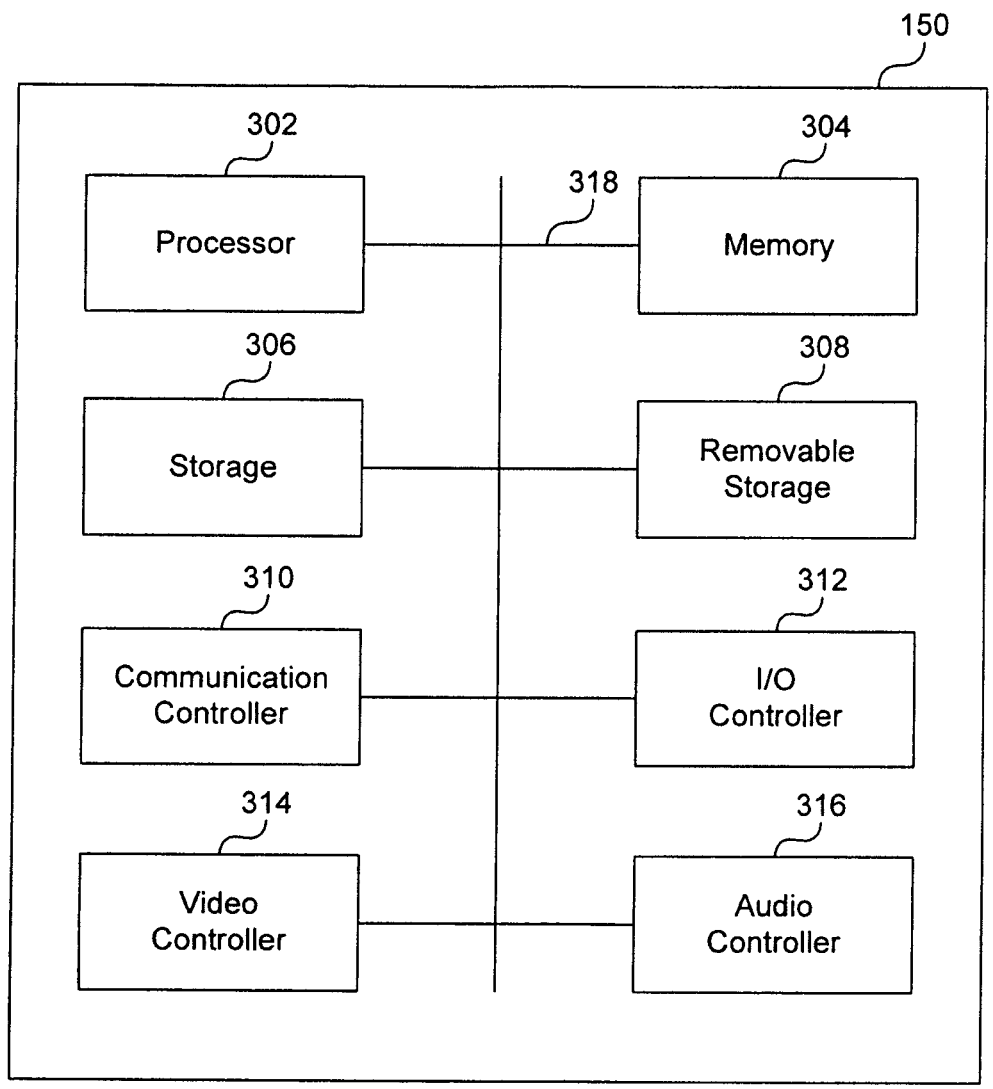
FIG. 3 is a diagram of examples of components of a terminal.

FIG. 3 is a diagram of examples of components of terminal 150. Terminal may include a processor 302, such as a CPU. Terminal 150 may include a memory 304. Memory 304 may be, for example, a RAM. Terminal 150 may comprise a storage 306. Storage 306 may be a persistent storage including, for example, a hard drive, a flash drive, etc. Storage 306 may store, for example, an electronic document received from catalog server 120. Terminal 150 may comprise a removable storage 308 including, for example, a compact disk read only memory (CD-ROM), a flash memory card, etc.

Terminal 150 may comprise a communication controller 310 that operates the transmitter and receiver to enable terminal 150 to communicate with, for example, host server 110 and catalog servers 120-140 via network 180. Terminal 150 may comprises an input/output (I/O) controller 312 that detects users input from, for example, buttons 203A and 203B, volume buttons 206A and 206B, and scroll button 207, and controls output to display screen 204 and the speaker of terminal 150. I/O controller 312 may detect touch screen gestures on display screen 204 in disclosed embodiments where display screen 204 is a touch screen.

Terminal 150 may further comprises a video controller 314 for outputting graphics on display screen 204 to the user. Terminal 150 may comprise an audio controller 316 that operates audio port 210 and the speaker to input and output audio. These components (processor 302, memory 304, storage 306, removable storage 308, communication controller 310, I/O controller 312, video controller 314, and audio controller 316), and other components (not shown) of terminal 103 may be connected via a bus 308.

Figure 4:
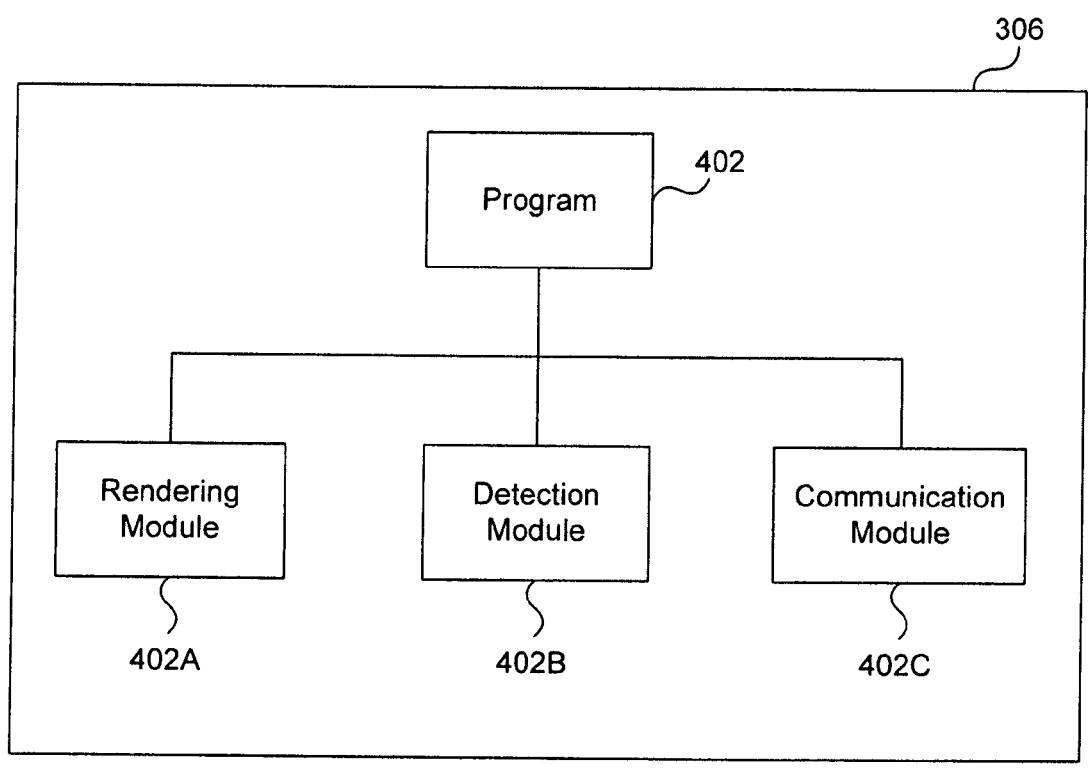
FIG. 4 is a diagram of an example of a software architecture providing functionality for a terminal.

FIG. 4 is diagram of an example of a software architecture providing functionality for terminal 150, consistent with a disclosed embodiment. The software architecture may be stored in, for example, storage 306 or removable storage 308.

In one embodiment, storage 306 may store instructions of program 402, which when executed by processor 302, perform one or more data processes. Program 402 may include a rendering module 402A, a detection module 402B, and a communication module 402C. Although program 402 is shown as being stored in storage 306, one of ordinary skill in the art will recognize that program 402 may be distributed across multiple components including removable storage 308 and components available over network 180. In one embodiment, program 402 may be loaded into memory 304 for execution by processor 302.

Rendering module 402A may include instructions for rendering graphics to be displayed on display screen 204. For example, video controller 314 may execute the instructions of rendering module 402A to control the graphics displayed on display screen 204. Detection module 402B may include instructions for receiving touch gestures on the touch screen of the display screen 204. Various touch screen gestures are described in detail below in connection with FIG. 5. Communication module 402C may include instructions for enabling communications on terminal 150. For example, communication module 402C may include instructions for operating the transmitter, the receiver, and port 208 (when used as a data port).

Although program modules 402A-402C have been described above as being separate modules, functionalities provided by one or more modules may be combined in keeping with the spirit and scope of the disclosed embodiments. For example, communication module 402C may comprise a receiver module and a transmitter module.

Figure 5A:
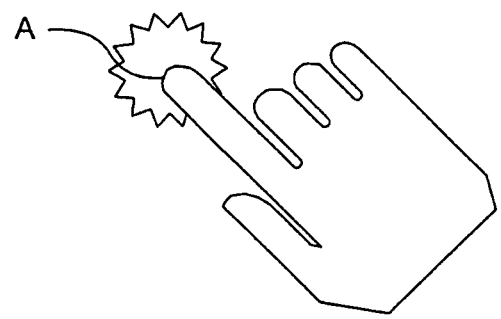
FIGS. 5A, 5B, and 5C are diagrams of examples of touch screen gestures.
Figure 5B:
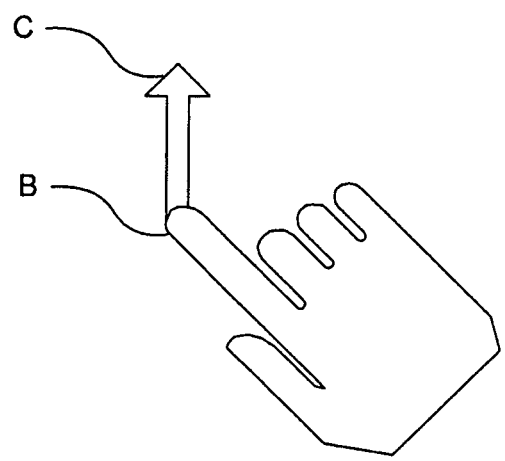
Figure 5C:
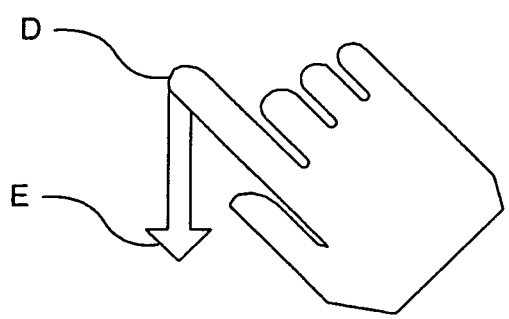

FIGS. 5A, 5B, and 5C are diagrams of examples of touch screen gestures. The touch screen of terminal 150 may be capable of detecting touches on display screen 204. Touches on display screen 204 may be performed by, for example, a human finger or a physical object such as a stylus. Terminal 150, through display screen 204, I/O controller 312, and detection module 402B, may be capable of determining, for example, the location of a touch, a release of the touch, the duration of the touch, the strength of the touch, a movement of the touch (e.g., a drag), etc. Furthermore, the touch screen may be capable of being depressed, in which terminal 150 may be capable of detecting a press gesture on the display screen 204.

FIG. 5A shows an example of a tap gesture. A tap gesture includes a touch and a release, or alternatively, a press and a release. A user may perform a tap gesture by tapping on display screen 204 of terminal 150. For example, as illustrated in FIG. 5A, the user may touch the tip of a finger on location A on display screen 204. A tap gesture typically involves a finger touching display screen 204 for a short duration. FIG. 5A also shows an example of a long tap gesture. A long tap gesture includes a touch, and then a hold, followed by a release. A long tap gesture is similar to a tap gesture except that a finger touches display screen 204 for a longer duration, i.e., the duration of the hold gesture.

FIG. 5B shows an example of an upward swipe gesture. A swipe gesture involves a touch gesture, a drag gesture, and then a release gesture. For example, as illustrated in FIG. 5B, the user may touch the tip of a finger at location B on display screen 204, then drag the finger upward towards location C while touching display screen 204, and then releasing at location C by lifting the finger off display screen 204. Terminal 150 may detect the touch gesture at location B, the drag gesture upward towards location C, and the release gesture at location C, and thus register an upward swipe gesture. The upward swipe gesture need not be perfectly upright or even perfectly straight. Some variance may be allowed for such a gesture.

FIG. 5C shows an example of a downward swipe gesture. For example, the user may swipe down from location D to location E on display screen 204, such that terminal 150 will register a downward swipe gesture.

In addition to the above-described upward and downward swipe gestures, the user may execute other swipe gestures in various directions including horizontal (rightward and leftward) gestures and diagonal gestures. Furthermore, a swipe gesture may also be called a drag gesture. Typically, a drag gesture may be executed slower than a swipe gesture. Furthermore, a pinch gesture or a spread gesture may be executed by the user using two fingers (e.g., a thumb and an index finger). The user may execute a pinch gesture by executing two swipe gestures concurrently such that the directions of the two swipe gestures are directed towards each other. The user may execute a spread gesture by executing two swipe gestures concurrently such that the directions of the two swipe gestures are directed away from each other.

Figure 6:
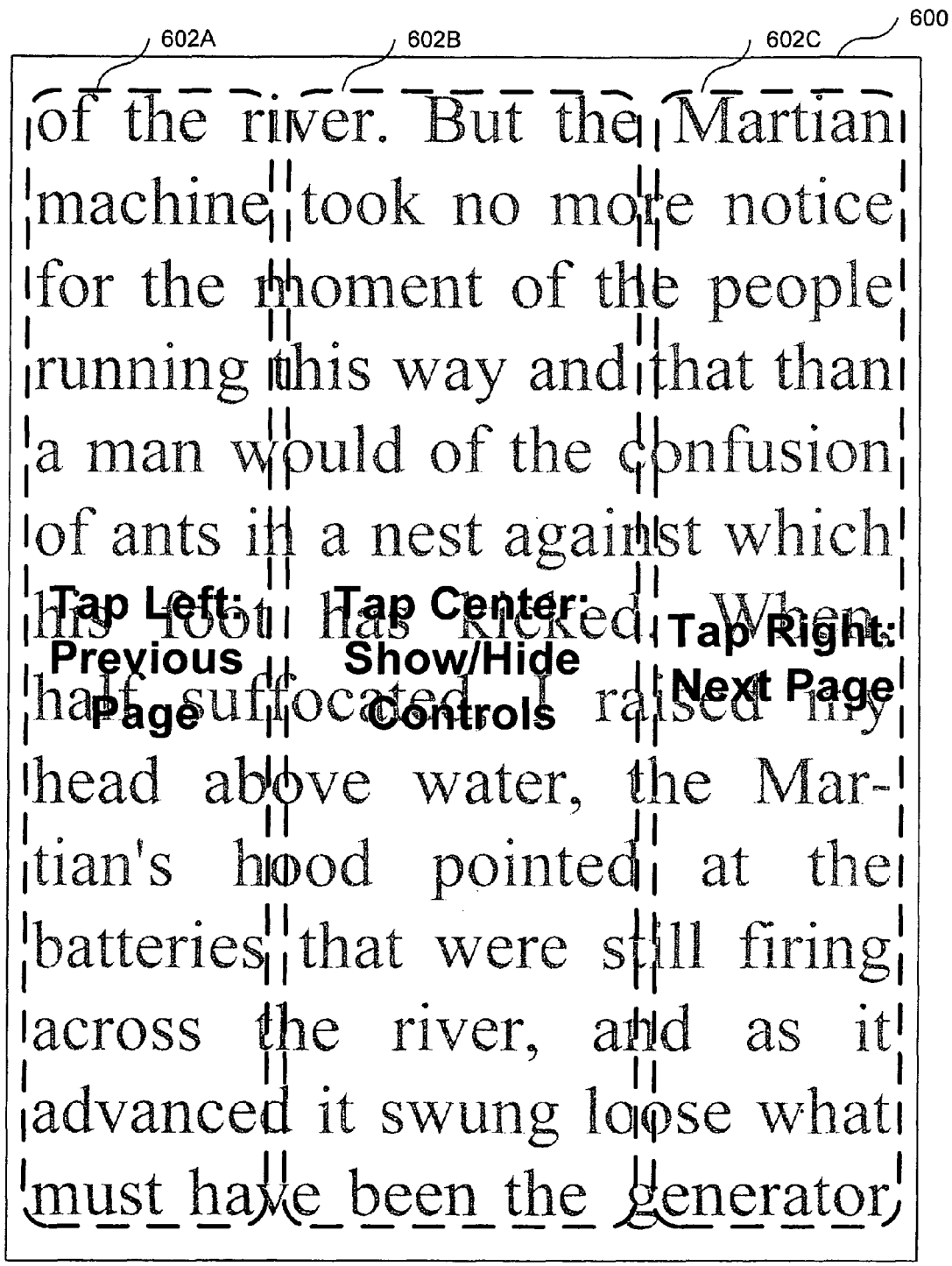
FIG. 6 is an example of a screen in a portrait orientation including regions.

FIG. 6 is an example of a screen 600 in portrait orientation including regions 602A-602C. Screen 600 may be displayed on display screen 204 of terminal 150 in portrait orientation. In one embodiment, a left region 602A, a center region 602B, and a right region 602C may be defined within screen 600. Although three regions are shown in screen 600, any number of regions may be defined and each region may be any shape or size.

Screen 600 may display an electronic document, which has been overlaid by regions 602A-602C. Screen 600 may also include boundaries of regions 602A-602C as well as commands assigned to regions 602A-602C. For example, left region 602A may be assigned a command to display the previous page of the electronic document, center region 602B may be assigned a command to display or hide control objects, and right region 602C may be assigned a command to display the next page of the electronic document. Any command that may be executed on terminal 150 may be assigned to any of regions 602A-602C. One or more of regions 602A-602C may be assigned no command. Furthermore, terminal 150 may provide default command assignments for regions 602A-602C and/or the command assignments may be configurable by a user.

FIG. 7 is an example of a screen 700 in landscape orientation including regions 702A-702C. Screen 700 may be displayed on display screen 204 of terminal 150 in landscape orientation. Similar to screen 600, screen 700 includes a left region 702A, a center region 702B, and a right region 702C. As illustrated, the size and shape of regions 702A-7020 are different from regions 602A-602C. The boundaries of regions 602A-602C and regions 702A-702C may be defined based on the size and shape of screen 600 and screen 700, respectively.

FIG. 8A is an example of a screen 810 displaying an electronic document. Screen 810 may be displayed on display screen 204 of terminal 150. In one embodiment, screen 810 includes the electronic document, but does not include any control objects, such as menus, buttons, scroll bars, etc.

FIG. 8B is an example of a screen 820 displaying an electronic document and control objects. Screen 820 may be displayed on display screen 204 of terminal 150. In one embodiment, control objects may be overlaid in front of the displayed electronic document such that the electronic document is partially visible through transparent portions of the control objects. Control objects may include, for example, menus, buttons, scroll bars, informational displays, among others.

Figure 9:
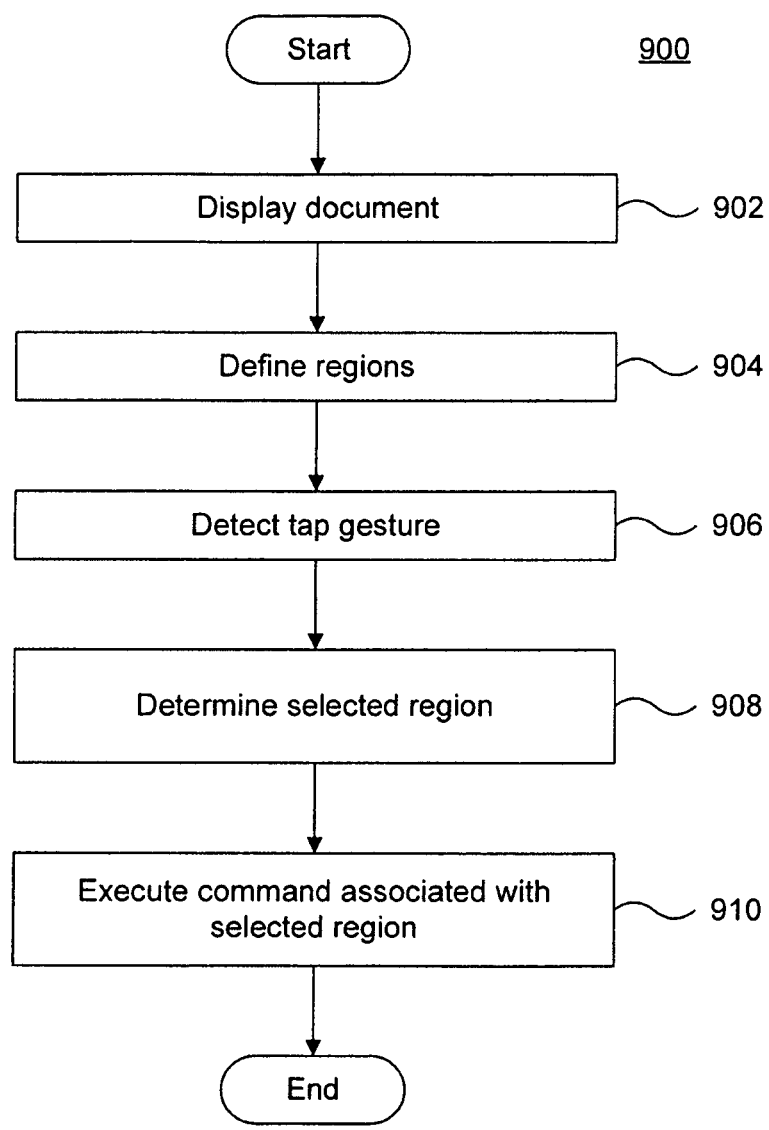
FIG. 9 is a flow diagram of an example of routine for executing a command based on a selected region.

FIG. 9 is a flow diagram of an example of routine 900 for executing a command based on a selected region, consistent with a disclosed embodiment. Routine 900 may implement processes according to one or more of program modules 402A-402C.

At the start of routine 900, in block 902, rendering module 402A may display an electronic document on display screen 204. The electronic document may be stored in, for example, storage 306 or removable storage 308. Terminal 150 may have received the electronic document from catalog server 120 via network 180. In one embodiment, display screen 204 may display the electronic document with no control objects, as illustrated in FIG. 8A, to fully utilize the limited screen real estate for electronic document viewing.

In block 904, one or more of regions 602A-602C may be defined within display screen 204 by processor 302. Although routine 900 is described in connection with regions 602A-602C of FIG. 6, routine 900 may be implemented in a similar manner with respect to regions 702A-702C of FIG. 7. Regions 602A-602C may be defined based on the size and size of display screen 204. In an alternative embodiment in which not all of the available space on display screen 204 is used for displaying the electronic document, but rather only a portion of display screen 204 is dedicated to a window for displaying the electronic document, regions 602A-602C may be defined based on the size and shape of the window. For examples, the regions defined in screen 600 and the regions defined in screen 700 may vary in size and shape because the size and shape of screen 600 and screen 700 may vary.

In one embodiment, display screen 204 is divided into three horizontal regions 602A-602C, as illustrated in FIGS. 6 and 7. Horizontal regions 602A-602C may be positioned side-by-side, whereas vertical regions may be positioned top-to-bottom. Defined regions 602A-602C may be of same or similar shape and size, or they may be of different shapes and sizes. Other numbers of regions and other sizes and shapes of regions are possible (e.g., five vertical regions).

Furthermore, terminal 150 may assign commands to each of regions 602A-602C. Any command that may be executed by terminal 150 may be assigned to defined regions 602A-602C. Terminal 150 may include default assignments of commands to regions 602A-602C. In addition, the assignments of commands to regions 602A-602C may be configurable by a user. The assignments of commands to the regions (including current assignments, default assignment, and user-configured assignments) may be stored in storage 306.

In one embodiment, rendering module 402A may display the boundaries of regions 602A-602C on display screen 204, as illustrated in FIG. 6 and similarly illustrated in FIG. 7 with respect to regions 702A-702C. For example, the boundaries of regions 602A-602C may be displayed when the electronic document is first displayed on display screen 204. The boundaries of regions 602A-602C may be automatically hidden after a predefined delay or after a user taps on display screen 204. In addition, the commands assigned to regions 602A-602C may be displayed on display screen 204 along with the boundaries, as illustrated in FIG. 6 and similarly illustrated in FIG. 7 with respect to regions 702A-702C. Furthermore, instructions may be displayed on display screen 204 that instruct the user how to input commands and control terminal 150 using regions 602A-602C. For example, the instructions may state, "Tap on a region to execute a command." Alternatively, the instructions may not need to be displayed because the displaying of the regions and their assigned commands is self-explanatory.

A user who wishes to execute one of the commands assigned to regions 602A-602C may, for example, tap a finger or a stylus on display screen 204 within one of regions 602A-602C associated with the desired command. In one embodiment, the user may tap on the desired one of regions 602A-602C even when the boundaries of regions 602A-602C are not displayed. That is, even when only the electronic document is displayed on display screen 204 without any visible control objects and without any visible boundaries of regions 602A-602C, as illustrated in FIG. 8A, the user may still tap on a portion of the displayed electronic document corresponding to a location within defined regions 602A-602C, and terminal 150 will execute the command associated with the selected one of regions 602A-602C.

In block 906, detection module 402B may detect a tap gesture on display screen 204. For example, a user may tap on display screen 204, which may be a touch screen, using, for example, a finger or a stylus. Although routine 600 is described with respect to a tap gesture, detection module 402B may detect any other types of touch screen gestures. Furthermore, although routine 600 is described with respect display screen 204 being a touch screen, disclosed embodiments may be applicable to a conventional user input device (such as mouse) and conventional display devices including non-touch screen type displays. Detection module 402B may further determine the location of the tap gesture on display screen 204 in relation to defined regions 602A-602C.

In block 908, processor 302 may determine which of regions 602A-602C was selected by the user based on the location of the detected tap gesture determined by detection module 402B in relation to the boundaries of regions 602A-602C. For example, if the location of the tap gesture falls within right region 602C, then terminal 150 would determine that right region 602C was selected by the user.

In block 910, processor 302 may execute the command assigned to the selected region. For example, if the user selected right region 602C and a command to display the next page of the electronic document is assigned to right region 602C, then processor 302 may execute that command to cause rendering module 402A to display the next page of the electronic document on display screen 204. Therefore, in one embodiment, a user may view the electronic document by utilizing the entire display screen 204 without any visible control objects and still navigate forward through the electronic document page by page simply by tapping within right region 602C on display screen 204.

Alternatively, if the user selected center region 602B and a command to display control objects is assigned to center region 602B, then processor 302 may execute that command to cause rendering module 402A to display control objects on display screen 204, as illustrated in FIG. 8B. The displayed control objects may provide the user access to more commands than the set of commands assigned to defined regions 602A-602C.

Furthermore, the user may tap on center region 602B while control objects are displayed, which will cause terminal 150 to hide the displayed control objects, returning display screen 204 to FIG. 8A.

As one of ordinary skill in the art will appreciate, one or more of blocks 902-910 may be optional and may be omitted from implementations in certain embodiments. Furthermore, functionality provided by one or more of blocks 902-910 may be subdivided into multiple blocks.

FIG. 10A is an example of a screen 1010 displaying an electronic document including a plurality of elements. Screen 1010 may be displayed on display screen 204 of terminal 150. Elements may include any graphical object that may be displayed on display screen 204. For example, elements may include a word or a group of words (such as sentences, paragraphs, etc.), an image, a video, a hyperlink, an icon, etc. Furthermore, an element may include one or more subelements. For example, a paragraph constituting an element include multiple words, each word constituting a subelement.

FIG. 10B is an example of a screen 1020 displaying an electronic document and a highlighted element. Screen 1020 may be displayed on display screen 204 of terminal 150. Screen 1020 displays the same elements (i.e., same paragraphs) as screen 1010, but in screen 1020 one of the displayed elements is highlighted (i.e., element 1022 is highlighted).

Figure 11:
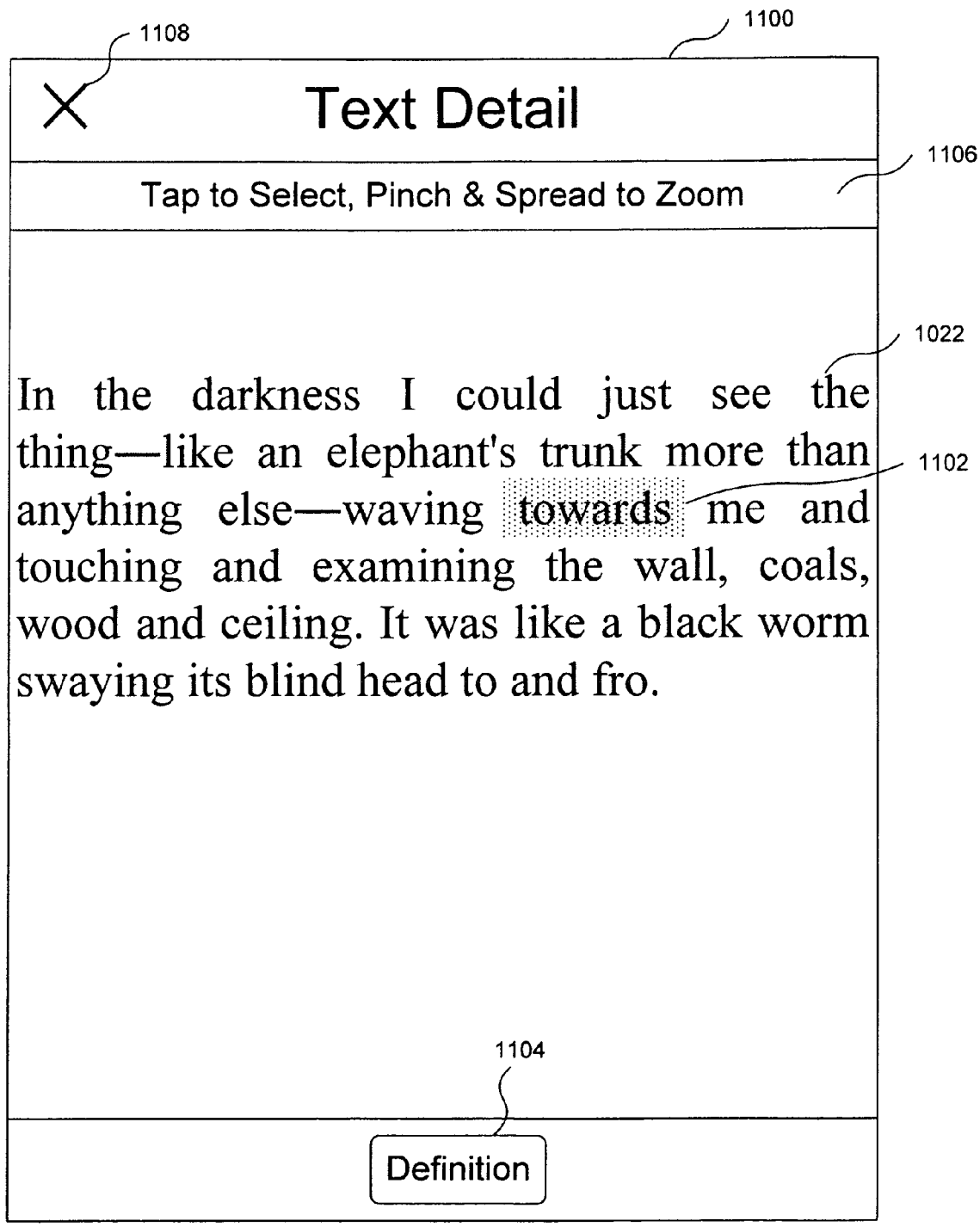
FIG. 11 is an example of a simple view of an element.

FIG. 11 is an example of a screen 1100 including a simple view of element 1022. In one embodiment, a simple view may include one activated element. For example, the simple view illustrated in screen 1100 includes element 1022 that is highlighted in screen 1020, but the simple view does not include other paragraphs that are not highlighted in screen 1020. Element 1022 may be displayed larger in the simple view compared to screen 1120.

The simple view may enable the user to select a subelement within element 1022. For example, as illustrated in FIG. 11, subelement 1102 (i.e., the word "towards") is highlighted. Furthermore, the simple view may include one or more action buttons related to element 1022 and subelement 1102. In one embodiment, the simple view may include a definition button 1104 for providing a definition of the selected subelement 1102. The simple view may further include a close button 1108, the selection of which will exit the simple view and return to display screen 204 back to screen 1010 for viewing the electronic document. The simple view may include instructions 1106 informing the user how to select a subelement of element 1022 and how to pan and zoom element 1022.

In addition, the simple view may enable the user to pan and zoom element 1022. For example, the user may pan element 1022 by a drag gesture. Also, the user may zoom element 1022 by using a pinch gesture and a spread gesture. A pinch gesture may cause terminal 150 to shrink the size of element 1022 displayed in the simple view, as illustrated in FIG. 12A.

FIG. 12A is an example of a screen 1210 including a simple view of element 1022 displayed in a small size. Furthermore, a spread gesture may cause terminal 150 to enlarge the size of element 1022 displayed in the simple view, as illustrated in FIG. 12B. FIG. 12B is an example of a screen 1220 including a simple view of element 1022 displayed in a large size.

Figure 13:
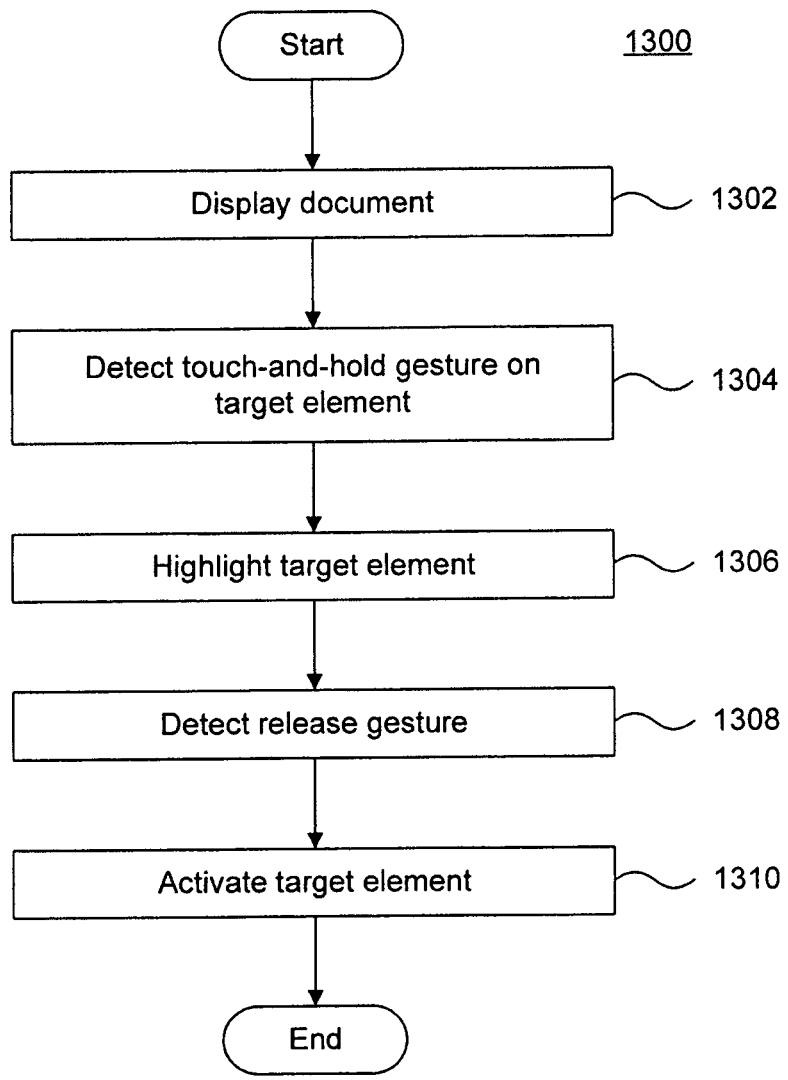
FIG. 13 is a flow diagram of an example of a routine for activating an element.

FIG. 13 is a flow diagram of an example of a routine 1300 for activating an element, consistent with a disclosed embodiment. Routine 1300 may implement processes according to one or more of program modules 402A-402C.

At the start of routine 1300, in block 1302, rendering module 402A may display an electronic document on display screen 204, as illustrated in FIG. 10A. The displayed electronic document may include one or more elements—in this example, several paragraphs.

In block 1304, detection module 402B may detect a touch-and-hold gesture on display screen 204. Detection module 402B may also determine the location of the touch-and-hold gesture. Furthermore, processor 302 may determine an element that corresponds to the location of the touch-and-hold gesture based on the location of the element on display screen 204, the corresponding element being a target element. For example, if the user touches a finger on the third paragraph displayed on display screen 204 and holds the finger on display screen 204, then terminal 150 may determine that the target element is element 1022, illustrated in FIG. 10B.

In block 1306, rendering module 402A may highlight the target element by, for example, displaying a box or other shape around the target element. The box may be filled with a color. In the example illustrated in FIG. 10B, target element 1022 (i.e., the third paragraph) is highlighted. The highlighting may inform the user which of the displayed elements terminal 150 determined as being selected by the touch-and-hold gesture, and will subsequently be activated upon release of the touch-and-hold gesture.

In one embodiment, the user may cancel the selection of the target element. For example, if the highlighted element is not the element that the user intended to select and activate, the user may drag his finger away from the highlighted element. If such gesture is executed by the user, then detection module 402B may detect the drag gesture and rendering module 402A may remove the highlighting to indicate cancellation of the element selection. The user may then release his finger off display screen 204.

If the highlighted element is the element that the user intended to select, then the user may release his finger over the highlighted element off display screen 204. In block 1308, detection module 402B may detect the release gesture. Detection module 402B may further determine the location of the release gesture, and processor 302 may confirm that the location corresponds to the target element.

In bock 1310, processor 302 may activate the target element. Depending on the type of the target element, the activation may entail various actions. For example, if the target element is an image, then rendering module 402A may display an enlarged view of the image. If the target element is a video, then rendering module 402A may play the video. If the target element is a word, then rendering module 402A may display a definition of the word. If the target element is a link to a section of the electronic document, then rendering module 402A may displayed the linked section of the electronic document. If the target element is a hyperlink to a web site, then rendering module 150 may display the web site associated with the hyperlink. If the target element is a paragraph, then rendering module 402A may display a simple view of the paragraph. Various other forms of activation are possible. Also, terminal 150 may enable the user to configure how various types of target elements may be activated.

As an example, if the user selects target element 1022 in FIG. 10B, then terminal 150 may display a simple view of target element 1022, as illustrated in FIG. 11.

As one of ordinary skill in the art will appreciate, one or more of blocks 1302-1310 may be optional and may be omitted from implementations in certain embodiments. Furthermore, functionality provided by one or more of blocks 1302-1310 may be subdivided into multiple blocks.

Figure 14:
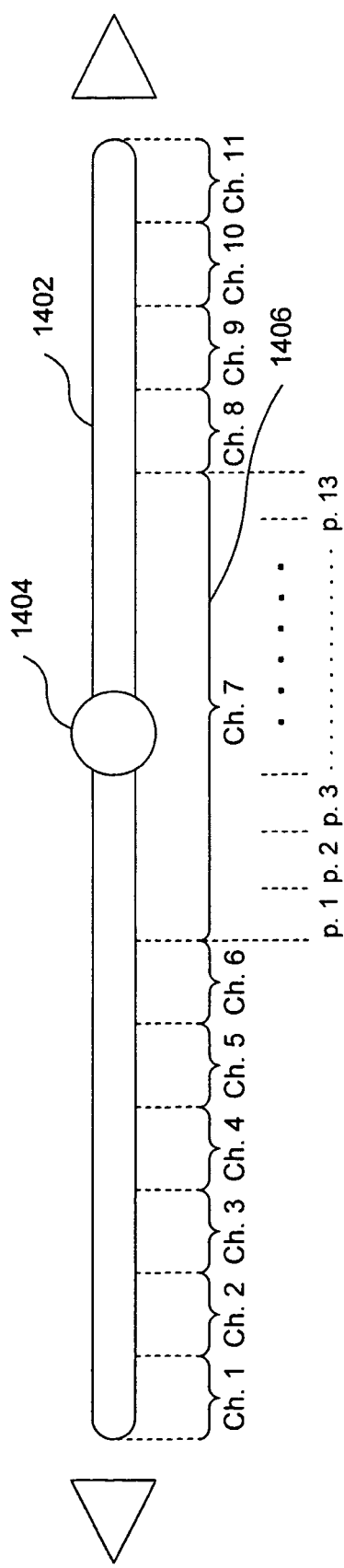
FIG. 14 is an example of a slide bar.

FIG. 14 is an example of a slide bar 1402, consistent with a disclosed embodiment. Slide bar 1402 may include a slider 1404, which may be moved from one end of slide bar 1402 to the other end of slide bar 1402. Slide bar 1402 and slider 1404 may be displayed on display screen 204 of terminal 150. Terminal 150 may enable a user to slide slider 1404 along slide bar 1402 using drag gestures. Slide bar 1402 may be used to enable a user to navigate through an electronic document.

For example, slide bar 1402 may be used to navigate through an electronic book comprising 11 chapters, wherein chapter 7 comprises 13 pages and other chapters 1-6 and 8-11 comprise varying number of pages.

In one embodiment, slide bar 1402 may be disproportionately divided such that slide bar 1402 is not evenly divided in proportion to the division of the electronic document. For example, if the electronic book comprises 100 pages, slide bar 1402 would not be divided into 100 equal parts, each part corresponding to one page.

In one embodiment, slide bar 1402 may include an expanded part 1406. Expanded part may constitute about a half of slide bar 1402. Expanded part 1406 may correspond to the currently-displayed chapter of the electronic book. In this example, if chapter 7 of the electronic document is being displayed on display screen 204, then expanded part 1406 may correspond to chapter 7. As depicted in FIG. 14, expanded part 1406, which corresponds to chapter 7, occupies a disproportionately larger part of slide bar 1402, while other chapters (i.e., chapters 1-6 and 8-11) occupy a disproportionately smaller part of slide bar 1402. This may be so even if chapter 7 is not necessarily the longest chapter of the electronic document.

In one embodiment, expanded part 1406 is further divided into multiple parts, each part corresponding to a page in chapter 7. Expanded part 1406 may be evenly divided in proportion to the number of pages in chapter 7.

In one embodiment, the divisions of slide bar 1402 (both chapter divisions and page divisions within expanded part 1406) may be visible when slide bar 1402 is displayed on display screen 204. Alternatively, these divisions may not be visible when slide bar 1402 is displayed on display screen 204. As yet another alternative, only the boundaries of expanded part 1406 may be displayed, while chapter divisions are not displayed.

FIG. 15 is an example of a screen 1500 including slide bar 1402 and slider 1404. Screen 1500 may be displayed on display screen 204 of terminal 150. In FIG. 15, slider 1404 is located within expanded part 1406 of slide bar 1402 at a position corresponding to page 5 of chapter 7, which is being displayed on display screen 204. Screen 1500 may further include a display of the chapter number and the page number corresponding to the displayed chapter and page.

FIG. 16 is an example of a screen 1600 including slide bar 1402 and slider 1404. Screen 1600 may be displayed display screen 204 of terminal 150. In FIG. 16, slider 1404 has be moved slightly to the right compared to FIG. 15, such that slider 1402 is located within expanded part 1406 of slide bar 1402 at a position corresponding to page 11 of chapter 7. In FIG. 16, slider 1404 is still within expanded part 1406 of slide bar 1402. Screen 1600 may further include a display of a target section (i.e., page 11 of chapter 7) corresponding to the location of slider 1404.

FIG. 17 is an example of a screen 1700 including slide bar 1402 and slider 1404. Screen 1700 may be displayed display screen 204 of terminal 150. In FIG. 17, slider 1404 has be moved even more to the right compared to FIGS. 15 and 16, such that slider 1404 is located outside expanded part 1406 on slide bar 1402 at a position corresponding to chapter 9. Screen 1700 may further include a display of a target section (i.e., chapter 9) corresponding to the location of slider 1404.

Figure 18:
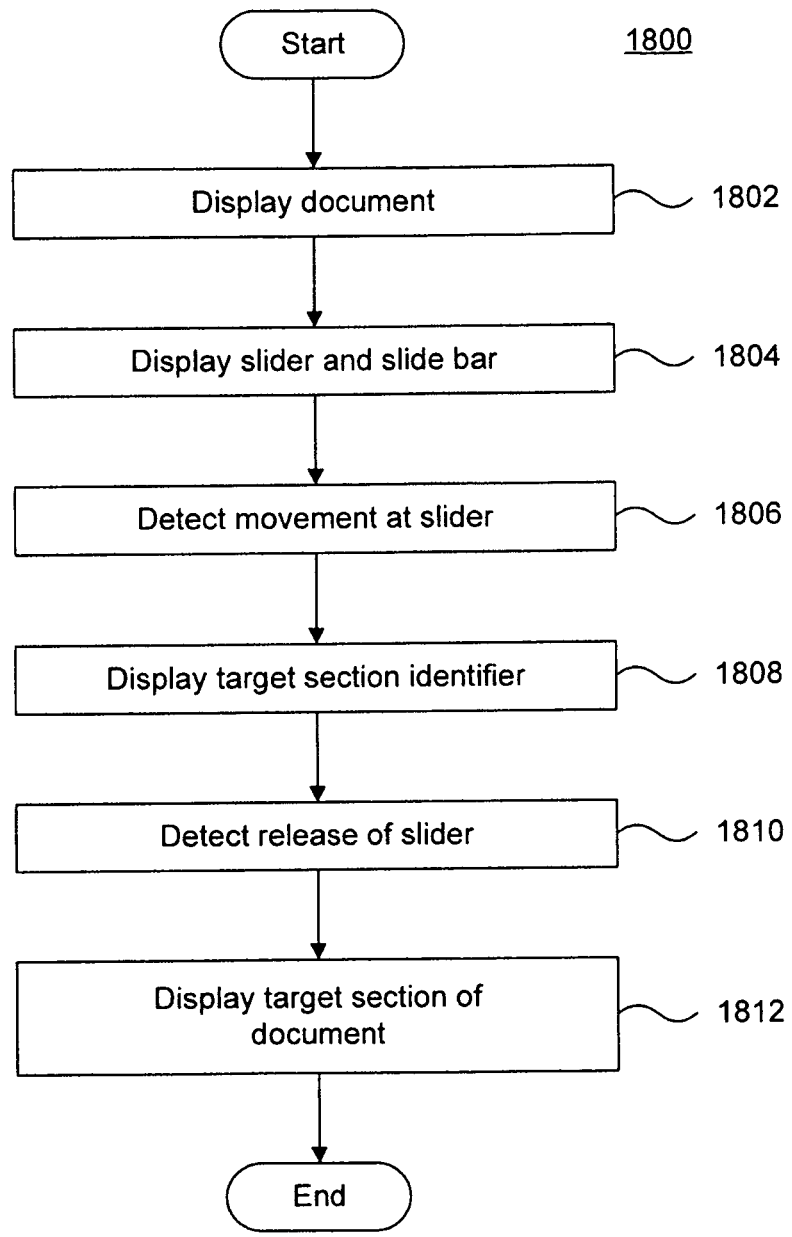
FIG. 18 is a flow diagram of an example of a routine for navigating an electronic document using a slide bar and a slider.

FIG. 18 is a flow diagram of a routine 1800 for navigating an electronic document using slide bar 1402 and slider 1404, consistent with a disclosed embodiment. Routine 1800 may implement processes according to one or more of program modules 402A-402C.

At the start of routine 1800, in block 1802, rendering module 402A may display an electronic document on display screen 204. In this example, as illustrated in FIG. 15, page 5 of chapter 7 of the electronic document is displayed, and chapter 7 includes 13 pages.

In block 1804, rendering module 402A may display slide bar 1402 and slider 1404 on display screen 204. For example, the user may have executed a tap gesture on center region 602B, which was detected by detection module 4026 and caused rendering module 402A to display control objects including slide bar 1402 and slider 1404 overlaid in front of the electronic document. As illustrated in FIG. 15, slider 1404 may be located on slide bar 1404 at a position corresponding to the currently displayed page and chapter of the electronic document, which is page 5 of chapter 7 in this example. Furthermore, rendering module 402A may also display the page number and the chapter number of the currently displayed section of the electronic document. In this example, "Chapter 7, Page 5/13" is displayed on display screen 204.

The user may move slider 1404 displayed on display screen 204 using a drag gesture to navigate to a different section of the electronic document. For example, the user may drag slider 1404 to the right within expanded part 1406 to navigate to a different page of chapter 7.

In block 1806, detection module 402B may detect the drag gesture corresponding to a movement of slider 1404 along slide bar 1402. In one embodiment, rendering module 402A may move the displayed slider 1404 on display screen 204 along with the detected drag gesture.

In block 1808, rendering module 402A may display a target page number based on the location of slider 1404 as slider 1404 is being dragged along slide bar 1402 within expanded part 1406. For example, in FIG. 16, slider 1404 has been moved slightly to the right compared to FIG. 15, and display screen 204 displays the target page number "Page 11/13." Although not illustrated, similar steps may be performed when slider 1404 is moved in leftward direction.

Moreover, the user may drag slider 1404 even further outside of expanded part 1406 to navigate to a different chapter. If the user drags slider 1404 even further along slide bar 1402 such that slider 1404 is located outside expanded part 1406 corresponding to chapter 7, detection module 402B may detect the drag gesture, and rendering module 402A may update the target chapter number displayed on display screen 204 as slider 1404 is being dragged along slide bar 1402 outside expanded part 1406 and hide the target page number from display screen 204. For example, in FIG. 17, slider 1404 has been moved even further to the right compared to FIGS. 15 and 16, outside of the boundaries of expanded part 1406. In response to the movement of slider 1404, rendering module 402B stopped displaying the target page number and updated the target chapter number from "Chapter 7" to "Chapter 9." Although not illustrated, similar steps may be performed when slider 1404 is moved leftward, outside of the left boundary of expanded part 1406.

In one embodiment, rendering module 402A may display the target page of the electronic document on display screen 204 based on the position of slider 1404 as the user is dragging slider 1404 along slide bar 1402, even before slider 1404 is released by the user. The displayed target page corresponding to the current position of slider 1404 may be partially visible through the displayed control objects, as illustrated FIGS. 16 and 17.

In block 1810, detection module 402B may detect a release gesture over slider 1404. For example, when the user has moved slider 1404 to a desired target section of the electronic document, the user may release slider 1404.

In block 1812, rendering module 402A may display the target section of the electronic document in response to the release gesture based on the location of slider 1404 when it was released.

As an example, if slider 1404 is released at a position corresponding to page 11 of chapter 7, as illustrated in FIG. 16, then rendering module 402A may display page 11 of chapter 7 of the electronic document on display screen 204. As another example, if slider 1404 is released at a position corresponding to chapter 9, as illustrated in FIG. 17, then rendering module 402A may display the first page of chapter 9 of the electronic document on display screen 204.

Furthermore, if the displayed chapter is changed (e.g., from chapter 7 to chapter 9), then terminal 150 may associate expanded part 1406 with chapter 9 and calculate the proper divisions of slide bar 1402 such that other chapters 1-8, 10, and 11 constitute the parts of slide bar 1402 not taken up by expanded part 1406.

As one of ordinary skill in the art will appreciate, one or more of blocks 1802-1812 may be optional and may be omitted from implementations in certain embodiments. Furthermore, functionality provided by one or more of blocks 1802-1812 may be subdivided into multiple blocks.

FIG. 19A is an example of a screen 1910 including an electronic document. Screen 1910 may be displayed on display screen 204 of terminal 150. In one embodiment, as illustrated in FIG. 19A, the text of the electronic document is displayed in black color on a white background. FIG. 19B is an example of a screen 1920 including an electronic document and a partially opaque graphical object in front of the electronic document. In one embodiment, as illustrated in FIG. 19B, the text of the electronic document is displayed in black color against a white background. In addition, a graphical object whose size is equal to the size of screen 1920 is overlaid in front of the displayed electronic document.

Even if the actual brightness of screen 1920 remains the same, the perceived brightness of the electronic document visible through the partially opaque graphical object in front of the electronic document may vary depending on the opacity of the graphical object. In one embodiment, the opacity of the graphical object may be adjusted by a user. For example, the opacity of the graphical object may be adjusted from completely transparent to completely opaque.

The black text of the electronic document cannot appear any darker or dimmer because black is the darkest color. However, the white background of the electronic document may appear dimmer when viewed through the partially opaque graphical object. For example, as illustrated in FIG. 19B, the white background may appear gray in color.

Furthermore, in an alternative embodiment, the text of the electronic document may be displayed in a white color on a black background, which is desirable to some users when reading at night. In this scenario, the black background may not appear any dimmer through the partially opaque graphical object, but the white text may appear dimmer through the partially opaque graphical object depending on the opacity of the graphical object. For example, the white text may appear gray in color.

Although disclose embodiments are described with respect to colors black and white as well as perceived gray color, any other color may be used.

Figure 20:
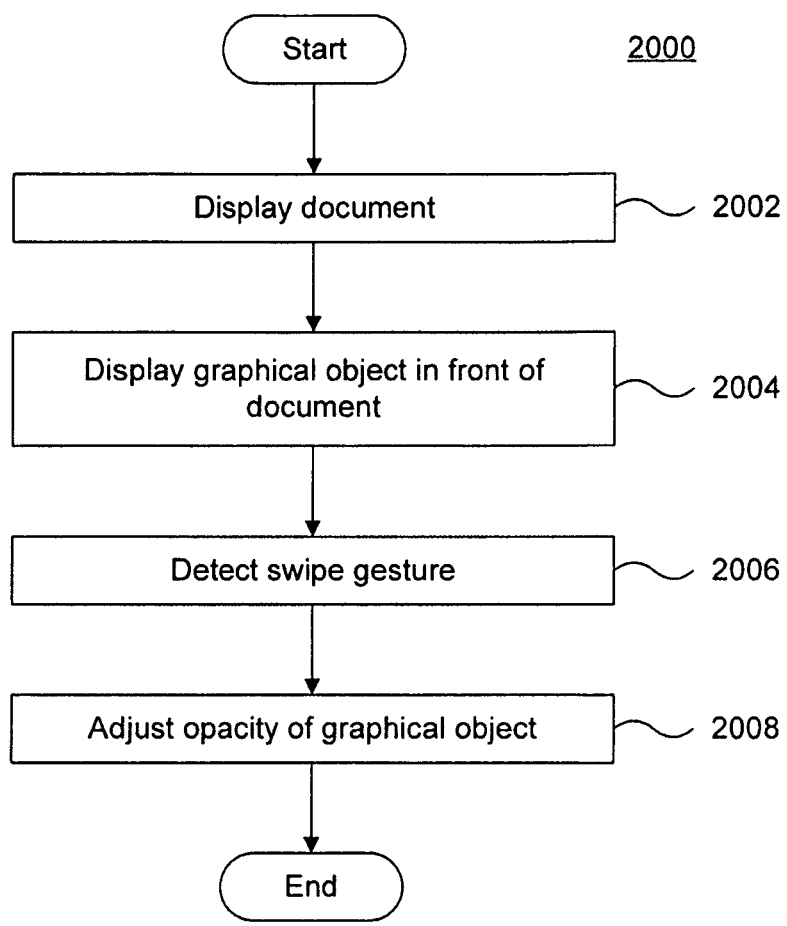
FIG. 20 is a flow diagram of an example of a routine for controlling the perceived brightness of an electronic document.

FIG. 20 is a flow diagram of an example of a routine 2000 for controlling the perceived brightness of an electronic document, consistent with a disclosed embodiment. Routine 2000 may implement processes according to one or more of program modules 402A-402C.

At the start of routine 2000, in block 2002, rendering module 402A may display an electronic document on display screen 204. For example, rendering module 402A may display the text of the electronic document in black color against a white background, as illustrated in FIG. 19A.

In block 2004, rendering module 402A may also display a graphical object in front of the displayed electronic document on display screen 204. The graphical object may be partially opaque such that the electronic document behind the graphical object is partially visible to a user through the graphical object. In one embodiment, the opacity of the graphical object may initially be set to the lowest level (i.e., completely transparent) such that the perceived brightness of the displayed electronic document is the highest brightness level. Alternatively, storage 306 may store the last opacity level of the graphical object and rendering module 402A may display the graphical object using the last opacity level stored in storage 306.

In one embodiment, the user may control the opacity of the displayed graphical object, and thereby control the perceived brightness of the electronic document, through touch gestures. For example, a vertical upward swipe gesture may be configured to increase the perceived brightness of the electronic document and, conversely, a vertical downward swipe gesture may be configured to decrease the perceived brightness of the electronic document. In other embodiments, different touch gestures, buttons on display screen 204, buttons 206A and 206B, scroll button 214, or the like, may be used to control the perceived brightness of the electronic document.

In block 2006, detection module 402B may detect a swipe gesture on display screen 204. Detection module 402B may further detect, for example, the direction of the swipe gesture, the length of the swipe gesture, the location of the swipe gesture, and the speed of the swipe gesture.

In block 2008, rendering module 402A may adjust the opacity of the graphical object in response to the detected swipe gesture. The opacity of the graphical object may be adjusted based on one or more of the direction of the swipe gesture, the length of the swipe gesture, the location of the swipe gesture, the speed of the swipe gesture, the current opacity level of the graphical object, and the maximum and minimum opacity levels of the graphical object.

For example, if the user executed a downward swipe gesture on display screen 204, then rendering module 402A may increase the opacity of the graphical object, thereby decreasing the perceived brightness of the electronic document. Conversely, rendering module 402A may decrease the opacity of the graphical object, thereby increasing the perceived brightness of the electronic document, in response to an upward swipe gesture on display screen 204 detected by detection module 402B.

Furthermore, the opacity of the graphical object may be adjusted based on the length of the swipe gesture; that is, a long swipe may cause a large adjustment in opacity level, while a short swipe may cause a small adjustment in opacity level. As another example, the opacity of the graphical object may be adjusted based on the speed of the swipe gesture; that is, a fast swipe may cause a large adjustment in opacity level, while a slow swipe may cause a small adjustment in opacity level. The amount of adjustment of the opacity of the graphical object may be based on other factors or a combination of many factors.

In one embodiment, terminal 150 may adjust the opacity of the graphical object after the swipe gesture has been fully executed and completed by the user. Alternatively, terminal 150 may adjust the opacity of the graphical object while the swipe gesture is being executed such that the user can stop the swipe gesture when the desired perceived brightness of the electronic document is achieved.

As one of ordinary skill in the art will appreciate, one or more of blocks 2002-2008 may be optional and may be omitted from implementations in certain embodiments. Furthermore, functionality provided by one or more of blocks 2002-2008 may be subdivided into multiple blocks.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting or deleting blocks. It is intended, therefore, that the specification and examples be considered as exemplary only, with a true scope and spirit being indicated by the following claims and their full scope of equivalents.

What is claimed is:

1. A computer-implemented method for navigating an electronic document on a portable device, the method comprising:
    displaying, by a processor of the portable device, the electronic document on a touch screen of the portable device;
    defining a plurality of regions on the touch screen;
    displaying, on the touch screen, boundaries of the plurality of regions as an overlay for the electronic document when the electronic document is first displayed on the touch screen;
    hiding, by the processor, the boundaries after a predetermined delay;
    detecting a tap gesture on the touch screen;
    determining a selection of one of the regions based on a location of the tap gesture on the touch screen; and
    executing, by the processor of the portable device, a command associated with the selected region.

2. The computer-implemented method of claim 1, wherein the command comprises displaying a next page of the electronic document.

3. The computer-implemented method of claim 1, wherein the command comprises displaying a previous page of the electronic document.

4. The computer-implemented method of claim 1, wherein the command comprises displaying control objects on the touch screen.

5. A computer-implemented method for navigating an electronic document on a terminal, the method comprising:
    defining a plurality of regions on a touch screen of the terminal based on a size of the touch screen, the plurality of regions including a left region on the touch screen to navigate the electronic document to a previous page and a right region on the touch screen to navigate the electronic document to a next page;
    displaying a first graphical rendition of a page of the electronic document on the touch screen, the first graphical rendition including boundaries of the plurality of the regions;
    displaying a second graphical rendition of the page of the electronic document on the touch screen after a predetermined period, the second graphical rendition without the boundaries of the plurality of the regions;
    detecting a tap gesture on the touch screen at one of the regions; and
    executing, by a processor of the terminal, in response to the detected tap gesture, a command associated with the region at which the tap gesture was detected.

6. The computer-implemented method of claim 5, wherein the executed command displays the next page of the electronic document.

7. The computer-implemented method of claim 5, wherein the executed command displays the previous page of the electronic document.

8. The computer-implemented method of claim 5, wherein:
    the plurality of regions further comprise a central region selectable to access a plurality of control objects.

9. The computer-implemented method of claim 8, further comprising:
    the executed command displays the plurality of control objects on the touch screen.

10. The computer-implemented method of claim 5, wherein the executed command is user configurable.

11. The computer-implemented method of claim 5, further comprising:
    detecting a change in a width of the electronic document displayed on the touch screen; and
    redefining, based on the detected change, the boundaries of the regions; and
    re-displaying the first graphical rendition of the page of the electronic document on the touch screen, the first graphical rendition including the redefined boundaries of the plurality of the regions.

12. The computer-implemented method of claim 11, wherein the executed command is defined by the terminal.

13. The computer-implemented method of claim 11, wherein detecting the change in the width of the electronic document displayed on the touch screen comprises detecting a change in an orientation of the terminal.

14. A portable electronic device comprising:
    a display; and
    one or more processors configured to perform acts comprising:
        displaying an electronic document on a touch screen of the portable electronic device;
        defining a plurality of regions on the touch screen;
        displaying boundaries of at least a first region of the plurality of regions as an overlay to the electronic document in response to displaying the electronic document on the touch screen of the portable electronic device;
        hiding the boundaries of the first region after a predetermined period of time has elapsed;
        detecting a tap gesture on the touch screen;
        determining a selection of the first region based on a location of the tap gesture on the touch screen; and
        executing, by the one or more processors of the portable electronic device, a command associated with the first region.

15. The portable electronic device of claim 14, wherein the command comprises displaying a next page of the electronic document.

16. The portable electronic device of claim 14, wherein the command comprises displaying a previous page of the electronic document.

17. The portable electronic device of claim 14, wherein the command comprises displaying control objects on the touch screen.

18. A system comprising:
one or more processors; and
one or more computer readable media storing computer-executable instructions that, when executed on the one or more processors, cause the one or more processors to perform acts comprising:
defining a plurality of regions on a touch screen of a terminal displaying an electronic document, the plurality of regions including a left region to navigate the electronic document to a previous page, and a right region to navigate the electronic document to a next page;
associating a command with at least one of the plurality of regions;
displaying a first graphical rendition of a page of the electronic document on the touch screen, the first graphical rendition including boundaries of the plurality of the regions;
displaying a second graphical rendition of the page of the electronic document on the touch screen after a predetermined period has elapsed, the second graphical rendition without the boundaries of the plurality of the regions;
detecting a tap gesture on the touch screen at one of the plurality of regions having an associated command; and
executing, by the one or more processors of the terminal, in response to the detected tap gesture, the command associated with the region at which the tap was detected.

19. The system of claim 18, wherein the executed command displays a next page of the electronic document.

20. The system of claim 18, wherein the executed command displays a previous page of the electronic document.

21. The system of claim 18, wherein:
the plurality of regions further comprise a central region selectable to access a plurality of control objects; and
the executed command displays the plurality of control objects on the touch screen.

22. The system of claim 21, wherein the plurality of control objects are overlaid on the page of the electronic document.

23. The system of claim 22, wherein the page of the electronic document is partially visible through the plurality of control objects.

24. The system of claim 18, further comprising:
detecting a change in a width of the electronic document displayed on the touch screen; and
redefining, based on the detected change, the boundaries of the regions.

25. The system of claim 24, further comprising:
displaying the redefined boundaries of the regions on the touch screen.

26. The system of claim 24, wherein detecting the change in the width of the electronic document displayed on the touch screen comprises detecting a change in an orientation of the terminal.

* * * * *